United States Patent
Battista et al.

(10) Patent No.: US 8,929,279 B2
(45) Date of Patent: *Jan. 6, 2015

(54) SYSTEM AND METHOD FOR MOBILE TERMINAL INITIATED SATELLITE COMMUNICATIONS

(75) Inventors: Rich Battista, Ashburn, VA (US); Jay Brosius, Frederick, MD (US); Uday Shankar, Herndon, VA (US)

(73) Assignee: SkyBitz, Inc., Herndon, VA (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/442,032

(22) Filed: Apr. 9, 2012

(65) Prior Publication Data
US 2012/0320756 A1 Dec. 20, 2012

Related U.S. Application Data

(63) Continuation of application No. 11/448,981, filed on Jun. 8, 2006, now Pat. No. 8,155,640.

(60) Provisional application No. 60/688,685, filed on Jun. 9, 2005.

(51) Int. Cl.
| | |
|---|---|
| *H04B 7/212* | (2006.01) |
| *H04J 3/08* | (2006.01) |
| *H04W 4/00* | (2009.01) |
| *H04W 40/00* | (2009.01) |
| *H04B 7/185* | (2006.01) |
| *H04W 72/12* | (2009.01) |
| *H04W 76/02* | (2009.01) |
| *H04W 84/06* | (2009.01) |
| *H04W 4/02* | (2009.01) |
| *H04W 28/04* | (2009.01) |
| *H04L 1/16* | (2006.01) |

(52) U.S. Cl.
CPC ....... *H04B 7/18539* (2013.01); *H04W 72/1289* (2013.01); *H04W 76/02* (2013.01); *H04W 84/06* (2013.01); *H04W 4/02* (2013.01); *H04W 28/04* (2013.01); *H04L 1/1607* (2013.01)
USPC .......................................... 370/321; 370/347

(58) Field of Classification Search
CPC .. H04W 4/02; H04B 7/18539; H04B 7/18545
See application file for complete search history.

(56) References Cited

U.S. PATENT DOCUMENTS

| | | | |
|---|---|---|---|
| 5,396,496 A | 3/1995 | Ito et al. | |
| 5,955,986 A | 9/1999 | Sullivan | |
| 6,094,162 A | 7/2000 | Sullivan | |
| 6,154,171 A | 11/2000 | Sullivan | |
| 6,169,514 B1 | 1/2001 | Sullivan | |
| 6,243,648 B1 | 6/2001 | Kilfeather et al. | |
| 6,480,788 B2 | 11/2002 | Kilfeather et al. | |
| 6,560,536 B1 | 5/2003 | Sullivan et al. | |

(Continued)

OTHER PUBLICATIONS

Fazel et al, "Multi-Carrier and Spread Spectrum Systems," John Wiley & Sons, Ltd., pp. 93-94, 2003.

*Primary Examiner* — Chirag Shah
*Assistant Examiner* — Srinivasa Reddivalam
(74) *Attorney, Agent, or Firm* — Duane S. Kobayashi

(57) ABSTRACT

A system and method for improving efficiency of satellite communications is described. In one embodiment, efficient satellite communications is enabled through event-driven reporting by a mobile terminal.

10 Claims, 3 Drawing Sheets

(56) References Cited

U.S. PATENT DOCUMENTS

| | | |
|---|---|---|
| 6,567,397 B1 | 5/2003 | Campana et al. |
| 6,725,158 B1 | 4/2004 | Kilfeather et al. |
| 2002/0071413 A1 | 6/2002 | Choi |
| 2003/0043761 A1* | 3/2003 | Hladik .......................... 370/319 |
| 2006/0202817 A1 | 9/2006 | Mackenzie et al. |
| 2006/0268792 A1 | 11/2006 | Belcea |
| 2007/0263567 A1* | 11/2007 | Habetha et al. ............... 370/329 |
| 2008/0018496 A1 | 1/2008 | Tanner et al. |

* cited by examiner

SYSTEM AND METHOD FOR MOBILE TERMINAL INITIATED SATELLITE COMMUNICATIONS

This application is a continuation of non-provisional application Ser. No. 11/448,981, filed Jun. 8, 2006 now U.S. Pat. No. 8,155,640 which claims priority to provisional application No. 60/688,685, filed Jun. 9, 2005. Each of the above-identified applications is incorporated herein by reference in its entirety.

BACKGROUND

1. Field of the Invention

The present invention relates generally to satellite communication systems and methods and, more particularly, to a system and method for event-driven satellite communications.

2. Introduction

Tracking mobile assets represents a growing enterprise as companies seek increased visibility into the status of a service fleet (e.g., long-haul delivery fleet). Visibility into the status of a service fleet can be gained through mobile terminals that are affixed to service vehicles. These mobile terminals can be designed to generate position information that can be used to update status reports that are provided to customer representatives.

In generating status reports to a centralized facility, the mobile terminal can generate position information through the reception of satellite position signals such as that generated by the GPS satellite network. Processing these GPS signals, generating position information, and transmitting status reports to the centralized facility comes at the expense of the power requirements at the mobile terminal. Here, an increased number of reporting cycles reduces the effective battery life of the mobile terminal, thereby increasing the maintenance and field costs of the mobile terminals. Thus, what is needed is a system and method for increasing visibility into the mobile assets, while maintaining a reasonable battery life of the mobile terminal.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In accordance with the present invention, a system and method is provided that enables the sending of unscheduled reports by a mobile terminal to an operations center. These unscheduled reports can be on an on-demand or event driven basis. One example of an event is when a mobile asset either starts or stops moving. As would be appreciated any sensor (e.g., motion sensor, door sensor, volume sensor, environment sensor, etc.) can be used to generate a mobile terminal event that initiates the formulation and transmission of an unscheduled report.

In supporting start/stop events, the mobile terminal can be designed to include a motion sensor that is used to detect movement of assets and initiate GPS signal measurements for position determination. The motion sensor also aids in the determination of arrival and departure times. One example of an adaptive motion sensor is provided in U.S. patent application Ser. No. 11/377,653, entitled "System and Method for Adaptive Motion Sensing with Location Determination," which is incorporated herein by reference in its entirety.

Figure 1:
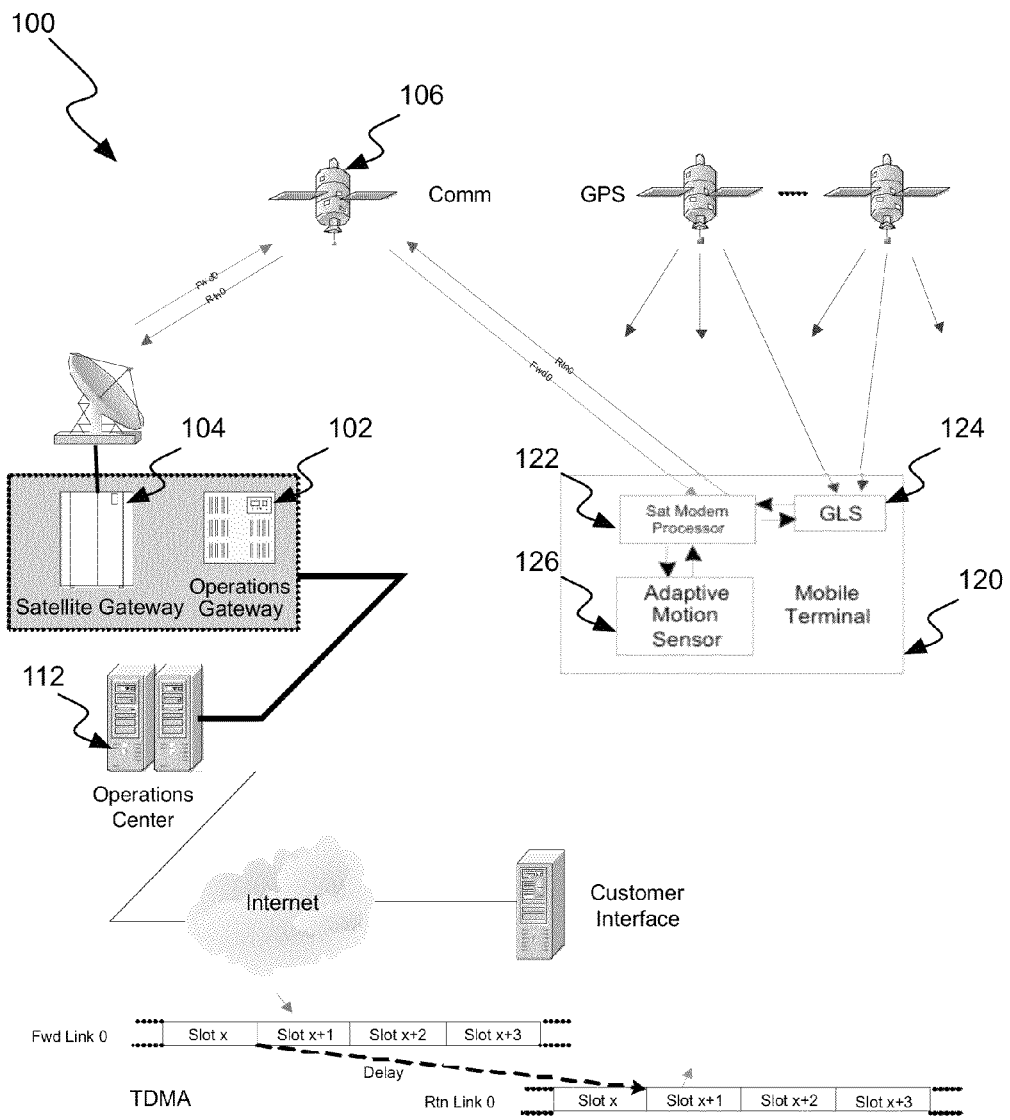
FIG. 1 illustrates an embodiment of a satellite communications network that enables the monitoring of remote assets.

FIG. 1 describes a communications network that enables a mobile terminal to deliver reports to an operations center. As illustrated, satellite network 100 includes operations gateway 102, communicating with satellite gateway 104, and has one forward and one return link (frequency) over satellite 106 to mobile terminal 120 located on the asset. From there, operations gateway 102 passes the information to operation center 112, where the information is used to solve for position and present the position information to the customer via the internet. A detailed description of this process is provided in U.S. Pat. No. 6,725,158, entitled "System and Method for Fast Acquisition Position Reporting Using Communication Satellite Range Measurement," which incorporated herein by reference in its entirety.

It should be noted that the principles of the present invention can also be applied to other satellite-based or terrestrial-based location determination systems where the position is determined at the mobile terminal independently, or at the mobile terminal in combination with information received from another location. Further as noted above, the principles of the present invention can be applied to events generated by any of a variety of sensor.

In the example of FIG. 1, mobile terminal 120 can also include a sensor. In this example, adaptive motion sensor 126 is used. The task of adaptive motion sensor 126 is to determine whether an asset is moving or not. From there, together with the mobile terminal processor (not shown) and GLS component 124 it can determine the arrival and departure times and locations of an asset. When an asset begins to move, adaptive motion sensor 126 detects the motion or vibration and sends a signal to the mobile terminal processor informing it that motion has started. The mobile terminal processor then records the time motion started, and signals to GLS component 124 to collect code phase. The start time and the codephase are sent over the satellite back to operations gateway 102 and operation center 112 where the codephase is used to solve for position, and the start time is used to generate the departure time. Conversely, when adaptive motion sensor 126 determines motion has stopped it will again inform the mobile terminal processor to collect time and codephase, and send the information back to operations gateway 102. Operation center 112 solves for position, and the stop time is used to generate the arrival time. The arrival and departure times along with their locations can be supplied to the user via the Internet. As noted, in an alternative embodiment, the mobile terminal could send a position determined at the mobile terminal back to operations center 112.

In one embodiment, the protocol supporting communications to and from mobile terminal 120 is a circuitless, packet-based protocol. This protocol can support scheduled or unscheduled reports, depending on the information required and the resources available. Scheduled report intervals can vary from less than a minute to a day, as desired. The protocol can also support gateway polling of specified mobile terminals to deliver commands or obtain information specified in the page. Pages to a mobile terminal may be either available at defined intervals, accommodating mobile terminal sleep modes, or on a continuously available basis, depending on mobile terminal monitoring capability. As noted, the protocol can also support unsolicited reports from mobile terminals, which may be used to report events, mobile terminal originated traffic, or other requirements. The protocol includes error checking and correction and both packet and external application acknowledgements, facilitating retries if desired.

In one embodiment, the protocol uses a demand-assigned time division multiplexed scheme, called a carousel, for interleaving multiple channel types on a frequency allocation on a beam over the communications satellite. Multiple simultaneous carousels on different frequency allocations within one or more satellite beams can be defined. The carousel can be designed to broadcast information to the mobile terminals describing the current carousel configuration along with pointers to guide the mobile terminal in a search for other carousels on the same beam or on other beams if needed.

The carousel can be implemented as a scheduled, cyclically repeating defined sequence of defined timeslots used to support communications to and from the mobile terminal. Communications between a large number of mobile terminals and the network are interleaved over the carousel in such a way as to provide the assignments yielding the bandwidth and timeliness necessary for each mobile terminal's operations. This structure facilitates communications while minimizing mobile terminal power consumption.

Figure 2:
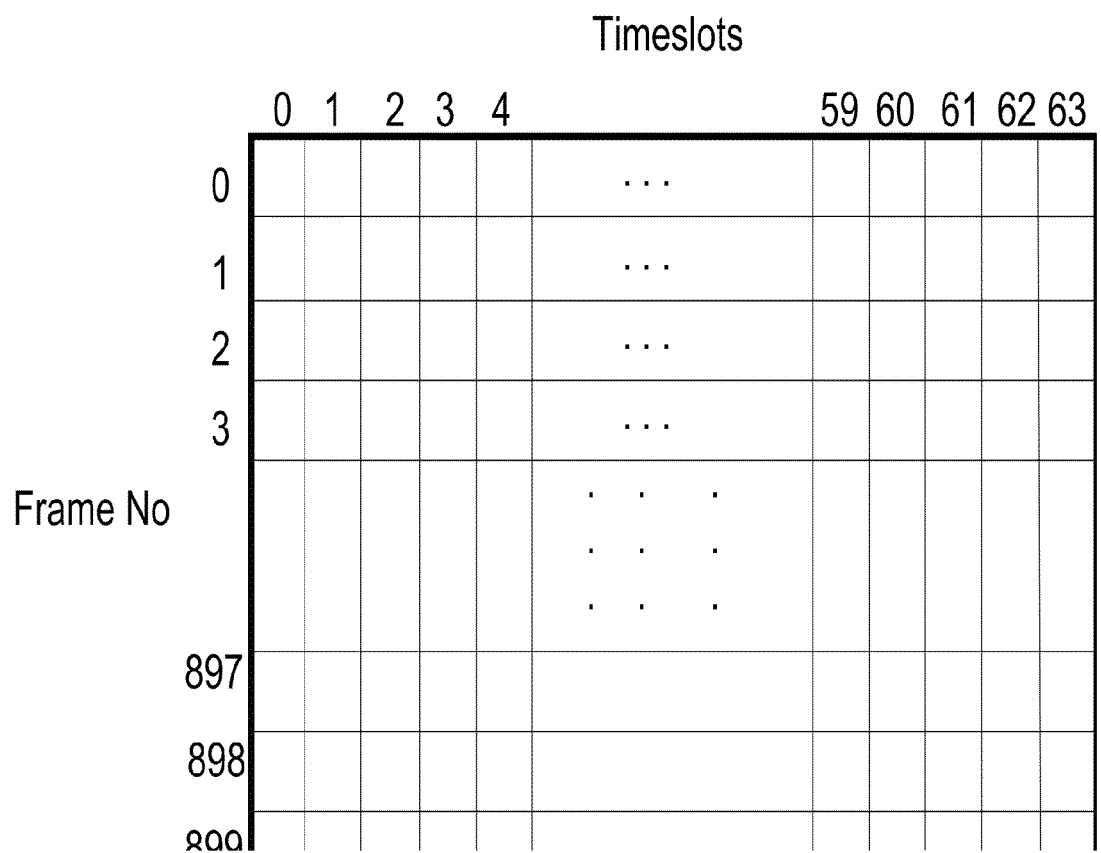
FIG. 2 illustrates an embodiment of a carousel of timeslots.

In one embodiment, the carousel is composed of 57,600 time slots per day and repeats each day. Each timeslot carries a packet of 165 bits. The timeslots are grouped into 900 frames (numbered sequentially from zero to 899) of 64 timeslots each. FIG. 2 illustrates the structure of a frame. Timeslot IDs run from 0 to 63 and frame boundaries occur at the beginning of the zero timeslot. Each timeslot is 1.5 seconds and each frame is 96 seconds. The period of the carousel is one day. In one embodiment, the carousel obtains its timing from Coordinated Universal Time, which synchronizes all elements of the system.

Carousels have both forward and return links. The forward link carries traffic from the gateway to the mobile terminal, whereas the return link carries traffic from the mobile terminal to the gateway. Multiple carousels may operate at the same time over a given beam of a satellite, each one having a forward link and a return link assigned to it at its own frequencies.

In one embodiment, the satellite waveform is implemented in a Time Division Multiplex (TDM) structure on the forward direction and a Time Division Multiple Access (TDMA) structure in the return direction. On the forward link, operations gateway 102 sends a message or packet to mobile terminal 120 on one of the 1.5 second slots to give instructions to global locating system (GLS) component 124 via satellite modem processor 122. One example is to instruct GLS component 124 to perform a GPS collection (e.g., code phase measurements) and transmit the data back to operations gateway 102. When GLS component 124 of mobile terminal 120 receives this forward command, it collects the GPS information and transmits the data back on the return link, on the same slot, delayed by a fixed time defined by the network. The delay is needed to decode the forward packet, perform the GPS collect and processing, and build and transmit the return packet.

Each frame is a sequence of 64 timeslots. It begins with a System Broadcast (SB) channel timeslot (timeslot 0) followed by a Beam Broadcast (BB) channel timeslot (timeslot 1).

The SB channel carries information about the carousel within which it is carried. It enables mobile terminals to gather information they need in order to operate effectively within the carousel. For example, a packet within the SB channel can include timing information, frame number, satellite number, carousel identity number, congestion level of the present carousel, and timeslot designation parameters for channels within the carousel.

The BB channel carries information that enables mobile terminal roaming between beams on the satellite. For example, a packet within the BB channel can include the carousel's forward frequencies on all other beams, the carousel's return frequencies for all other beams, the beam identity number, and GPS satellite identifiers for GPS satellites to be used within the area served by the beam.

Additional channel types can be assigned to the remaining 62 timeslots within a frame. As noted, a packet on the SB channel can designate the structure of the frame's last 62 timeslots, identifying the particular channel types. The different number of channel types supporting various functions can be varied in size to respond to relative demand, or even disabled and released for other uses if not needed.

In general, a channel can be viewed as an established series of timeslots in the carousel that constitute an on-going set of transmission opportunities for a specific type of traffic. In addition to the SB and BB channels, a Position/State (PS) channel and an Event/Registration (ER) channel can also be defined.

The PS channel carries scheduled position and/or state polls directed to mobile terminals in the forward direction and responses from the mobile terminals in the same timeslot in the return direction. Packets on the PS channel generally identify one or more mobile terminals that are scheduled to report together with identifiers of GPS satellite to be used. In the return direction the mobile terminal responds with code phase data along with other data (e.g., sensor data) on its current state as appropriate.

The ER channel, on the other hand, provides for unscheduled, mobile terminal initiated communications, including position and/or sensor data, with the gateway in the return direction. Gateway responses or acknowledgements to the respective mobile terminal are carried in the forward direction.

The system assigns each channel a sequence of timeslots in the frame, which repeat from frame to frame. Channels are typically interleaved in slot assignments to achieve desirable latency characteristics for each channel; however, this need not necessarily be true.

Gateways transmit a packet on every timeslot of the day in each carousel, and so essentially transmit full period. If no other packet is designated for transmission in a given timeslot, the gateway will transmit a No-Op (NO) packets in that slot. NO packets include some system data and the list of satellites in view to aid mobile terminals in staying current.

As noted, the timeslots 0 and 1 are reserved for SB and BB packets. Other timeslots in the frame may be designated for either PS or ER packets. Frame definitions are generally static from frame to frame, but can be changed, for example, to rebalance or optimize traffic on the carousel On any given PS channel timeslot, the gateway normally transmits PS payloads to a mobile terminal of a given mobile terminal address (MTA) assigned to the timeslot unless other traffic is pending. In the latter event, such traffic may supplant the PS for the slot, and direct the mobile terminal to further slots if necessary (including for a report in response to a PS if desired).

If the gateway addresses an MTA, but with no accompanying command identifying the information desired (perhaps because it is addressing more than one MT with different requests for each), the mobile terminal can respond on the appropriate following timeslot with a Request for Traffic (RT) payload, requesting traffic from the gateway. The gateway will then make its specific request or instruction known to that mobile terminal in its following response.

In many respects, the gateway is reactive to the mobile terminal. The mobile terminal initiates registration by sending a registration request on an ER channel, to which the gateway will respond with a registration assignment. The mobile terminal cannot accept assignments unless it is first registered, which also configures the mobile terminal.

Mobile terminals normally awaken to receive traffic, process information as necessary, transmit traffic, then put themselves back to sleep until the next scheduled wake-up. This conserves power, making the mobile terminal very power efficient. Mobile terminals are normally awake for around 10 seconds, a figure that can be varied as necessary depending on mobile terminal and processing needs.

Mobile terminals respond to commands in the PS channel regarding the payload type to be sent to the gateway for solicited scheduled traffic. Mobile terminals can be given assignments to awaken on PS channel timeslots at stated times during a day. A typical mobile terminal assignment might be one PS channel timeslot (report opportunity) per day to report and 12 slots per day to monitor. PS channel assignments can vary from one per day to one per frame.

As described, PS channels are assigned to mobile terminals and enable mobile terminals to report monitoring results on a scheduled basis. On-demand or event-driven reporting, however, requires a different form of channel assignment and usage to facilitate sporadic reports. This is especially true where one or more sensors trigger the generation of increasing amounts of report traffic.

It is a feature of the present invention that mobile terminals that are awakened on an event basis can transmit reports on a next usable timeslot that the mobile terminal identifies. Typically, the next usable timeslot will not be a timeslot assigned to the mobile terminal because the mobile terminal has been awakened at an unscheduled time.

Figure 3:
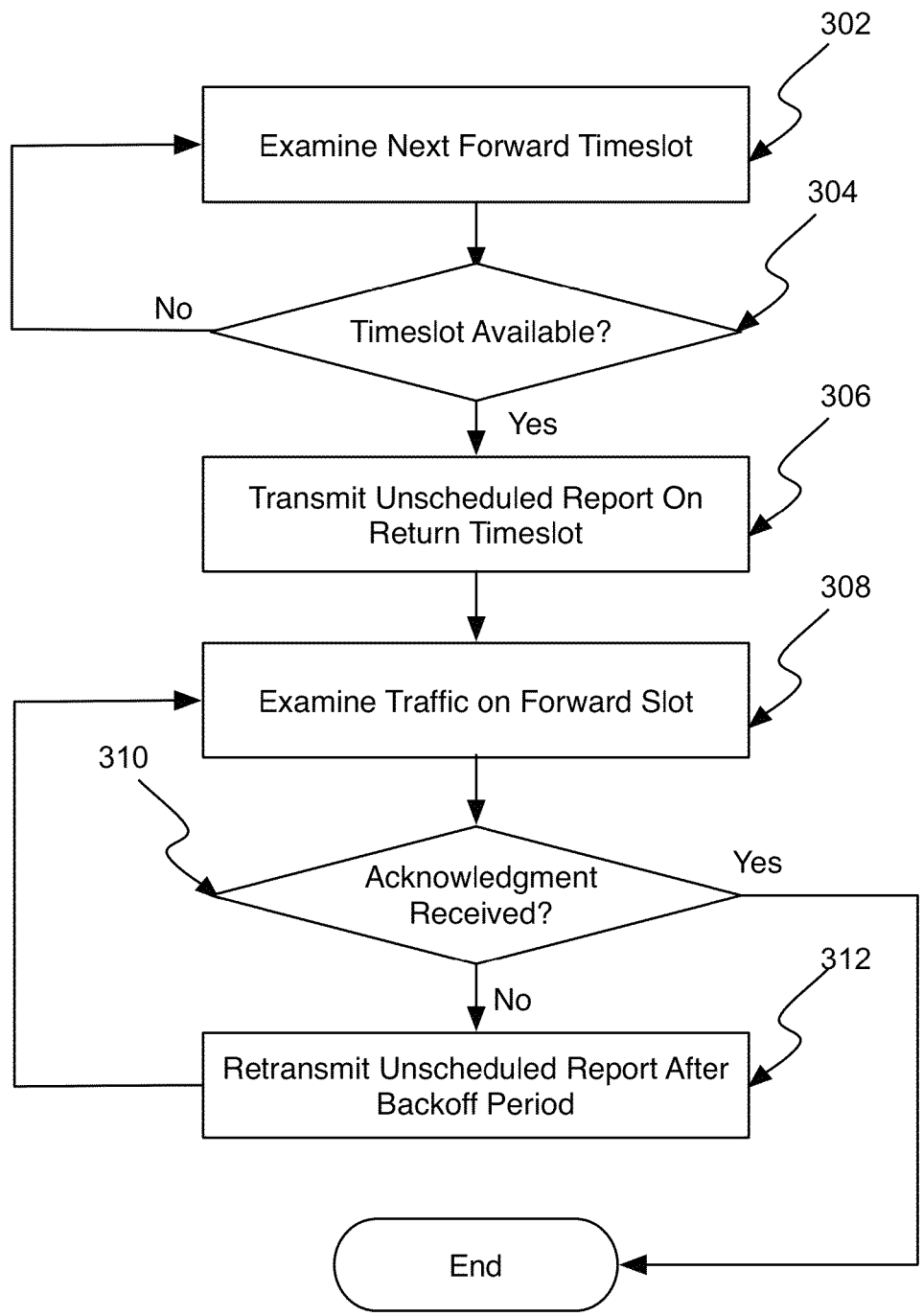
FIG. 3 illustrates a flowchart of a communication process of the present invention.

FIG. 3 illustrates an embodiment of a process for a mobile terminal to identify a next usable timeslot. As illustrated, this process begins at step 302, where the mobile terminal examines the next forward timeslot. The next forward timeslot can be assigned by the system for different purposes. For example, the next forward timeslot could support a PS channel, an ER channel, or some other channel type. In one embodiment, the mobile terminal is configured to search sequentially through the timeslots on the carousel to identify a timeslot that can be used. This sequential timeslot search process can begin at any point in time after the mobile terminal is awakened. For example, the sequential timeslot search process can begin immediately after the mobile terminal is awakened, or after a period of time has elapsed (e.g., after timeslots 0 and 1 have been received). It should also be noted that the search process need not consider every single timeslot in a sequence. In various embodiments, the search process can search through a subset of a block of timeslots, wherein the subset represents candidate timeslots. Regardless of the starting point and the timeslots considered, the search process is designed to identify a usable timeslot that was previously unassigned to the mobile terminal.

At step 304, the mobile terminal determines whether the timeslot is usable. Usability of a timeslot can be determined based on the traffic on the timeslot and the timeslot type. For example, if the mobile terminal determines that the timeslot supports an ER channel (e.g., based on the information carried on the SB channel on timeslot 0, and by an ERCFlag bit on a packet that is set to 1 if the timeslot is an ER channel timeslot), then the mobile terminal knows that the timeslot supports unscheduled, mobile terminal initiated communications with the gateway. If examination of the traffic on the ER channel timeslot suggests that another mobile terminal will not be using the return link to transmit a packet to the gateway, then the timeslot can be considered usable. In another example, the mobile can determine that the timeslot supports a PS channel. This PS channel may be assigned to another mobile terminal to support scheduled position reports. If the mobile terminal determines that a position/state request packet including an MTA is on the timeslot, then the mobile terminal knows that the timeslot is assigned to another mobile terminal. If the mobile terminal determines, however, that a NO packet is on the timeslot, then the mobile terminal knows that the timeslot is not assigned to another mobile terminal. The timeslot can then be considered to be usable. In general, the mobile terminal can examine any timeslot to determine whether the existing use or assignment of such a timeslot precludes the mobile terminal from considering it as a usable timeslot.

If, at step 304, the mobile terminal determines that the timeslot is not usable, then the mobile terminal will consider the next timeslot in the considered sequence. As noted above, this next considered timeslot need not be the immediately following timeslot. In one embodiment, the mobile terminal can be configured to limit the number of timeslots that it will consider in a sequence. For example, the mobile terminal can be configured to search through four timeslots in a sequence. In this example, if the fourth timeslot considered is determined not to be usable, then the mobile terminal would enter sleep mode and reawaken after a defined backoff period.

If, at step 304, the mobile terminal determines that the timeslot is usable, then the mobile terminal transmits the unscheduled report on the corresponding return timeslot at step 306.

Next, at step 308, the mobile terminal examines traffic on the forward timeslot corresponding to the return timeslot on which the unscheduled report was transmitted. For ER channels, the mobile terminal can examine the succeeding ER channel forward timeslot offset in time by the number of ER channel timeslots specified in the event/reporting acknowledgement offset (ERCAckOS) field in a system packet. For PS channels, the mobile terminal would examine the later forward timeslot that is determined based on the payload acknowledgment offset (PldAckOS) field in the system packet, which indicates how many time slots earlier contains the packet being acknowledged.

At step 310, the mobile terminal determines whether an acknowledgment has been received from the gateway on the forward timeslot. This acknowledgment is important because the unscheduled report is a mobile terminal initiative, and thus the burden is on the mobile terminal to ensure its receipt. A received acknowledgment informs the mobile terminal that the unscheduled report has been received. In general, it is possible that more than one mobile terminal may attempt to use the same timeslot that has been identified as usable. In one embodiment, multiple mobile terminals can transmit narrowband spread spectrum waveforms on the same usable timeslot. The gateway can then be configured to receive unscheduled reports from multiple mobile terminals. For example, if three mobile terminals transmit unscheduled reports on the same usable timeslot, the system may respond to two of the three mobile terminals. In this example, acknowledgement of the transmissions of two of the mobile terminals can be effected through an inclusion of two MTAs in the payload of a single acknowledgement packet.

If it is determined, at step 310, that an acknowledgment has been received, then the unscheduled report has been delivered and the process ends.

If, on the other hand, it is determined, at step 310, that an acknowledgment has not been received, then the mobile terminal will look to retransmit the unscheduled report on a later timeslot. It should be noted that in one embodiment, the mobile terminal can also be configured to check for acknowledgments in succeeding packets. This could occur, for example, if the mobile terminal transmitted an unscheduled report on a PS channel, wherein the timeslot identified by the PldAckOS field was needed by the gateway for other mobile terminal transmissions. In one embodiment, the identification of another available timeslot will not begin immediately. Rather, at step 312, the mobile terminal would apply a random backoff algorithm designed to minimize repeated collisions among mobile terminals and wait for a backoff period before identifying another available timeslot.

The mobile terminal can adjust the offset, or delay, to the next retry for an event transmission to minimize the probability of successive collisions and maximize mobile terminal power consumption efficiency. Therefore, the mobile terminal can increase the length of the interval over which it selects a transmission time depending on the number of preceding successive acknowledgement failures for earlier transmissions of the same event payload, the priority of the event, and the cause for the acknowledgement failure (signal blockage or signal collision). Priority scales the intervals with higher priorities reducing the interval sizes (lower priority numbers denote higher priority). Collisions prompt randomizing the timeslot selection over the delay interval rather than using the end of the interval. Collision and non-collision backoffs may use different scales. Collisions are detected by detecting a forward payload addressed to a particular mobile terminal other than itself.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A communications method in a mobile terminal, wherein communication between a plurality of mobile terminals and an operation center is supported by a carousel of cyclically repeating ordered sequence of timeslots, the method comprising:
    transmitting a scheduled report to the operation center on a scheduled timeslot in said carousel of cyclically repeating ordered sequence of timeslots, said scheduled timeslot assigned to the mobile terminal;
    detecting an occurrence of an event in the mobile terminal;
    identifying a usable communication timeslot based on a sequential analysis of a plurality of consecutive timeslots in said carousel that includes timeslots of a scheduled reporting timeslot type that are assigned to mobile terminals and timeslots of an unscheduled reporting timeslot type that are not assigned to mobile terminals, said sequential analysis of said plurality of consecutive timeslots including analyzing each of said plurality of consecutive timeslots in the order defined by said carousel, said analyzing identifying a timeslot of an unscheduled reporting timeslot type as a usable communication timeslot when it is determined that another mobile terminal will not be using a return link to transmit a packet; and
    transmitting an unscheduled report based on said detected event on said identified usable communication timeslot.

2. The method of claim 1, wherein said timeslots on a downlink are time division multiplexed timeslots.

3. The method of claim 1, wherein said timeslots on an uplink are time division multiple access timeslots.

4. The method of claim 1, wherein said identifying comprises identifying a timeslot of an event reporting timeslot type.

5. The method of claim 1, wherein said identifying comprises identifying a timeslot of a scheduled reporting timeslot type that is not currently assigned to a mobile terminal.

6. A mobile terminal in a communication system, wherein communication between a plurality of mobile terminals and an operation center is supported by a carousel of cyclically repeating ordered sequence of timeslots, comprising:
    a transmitter that transmits a scheduled report to the operation center on a scheduled timeslot in said carousel of cyclically repeating ordered sequence of timeslots, said scheduled timeslot assigned to the mobile terminal; and
    an event detector that detects an occurrence of an event in the mobile terminal; and
    a timeslot identifier that identifies a usable communication timeslot based on a sequential analysis of a plurality of consecutive timeslots in said carousel that includes timeslots of a scheduled reporting timeslot type that are assigned to mobile terminals and timeslots of an unscheduled reporting timeslot type that are not assigned to mobile terminals, said sequential analysis of said plurality of consecutive timeslots including analyzing each of said plurality of consecutive timeslots in the order defined by said carousel, said analyzing identifying a timeslot of an unscheduled reporting timeslot type as a usable communication timeslot when it is determined that another mobile terminal will not be using a return link to transmit a packet.

7. The mobile terminal of claim 6, wherein said timeslots on a downlink are time division multiplexed timeslots.

8. The mobile terminal of claim 6, wherein said timeslots on an uplink are time division multiple access timeslots.

9. The mobile terminal of claim 6, wherein said timeslot identifier identifies a timeslot of an event reporting timeslot type.

10. The mobile terminal of claim 6, wherein said timeslot identifier identifies a timeslot of a scheduled reporting timeslot type that is not currently assigned to a mobile terminal.

* * * * *